(12) United States Patent
Bandyopadhyay et al.

(10) Patent No.: US 9,163,595 B2
(45) Date of Patent: Oct. 20, 2015

(54) ENGINE HAVING AN AIR BOX BAFFLE

(71) Applicant: Electro-Motive Diesel, Inc., La Grange, IL (US)

(72) Inventors: Deep Bandyopadhyay, Naperville, IL (US); Farhan Devani, Morton Grove, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 14/017,527

(22) Filed: Sep. 4, 2013

(65) Prior Publication Data
US 2015/0059340 A1  Mar. 5, 2015

(51) Int. Cl.
| F01P 1/02 | (2006.01) |
| F02M 35/104 | (2006.01) |
| F02M 21/04 | (2006.01) |
| F02M 35/12 | (2006.01) |
| F02M 35/10 | (2006.01) |
| F02M 29/04 | (2006.01) |
| F02B 1/04 | (2006.01) |
| F02F 1/42 | (2006.01) |

(52) U.S. Cl.
CPC ........... *F02M 35/1045* (2013.01); *F02M 21/04* (2013.01); *F02B 1/04* (2013.01); *F02F 1/4242* (2013.01); *F02M 29/04* (2013.01); *F02M 35/10039* (2013.01); *F02M 35/10052* (2013.01); *F02M 35/10085* (2013.01); *F02M 35/10262* (2013.01); *F02M 35/1266* (2013.01); *Y02T 10/42* (2013.01)

(58) Field of Classification Search
CPC ............. Y02T 10/42; F02M 35/10039; F02M 35/10262; F02M 35/10085; F02M 35/10052; F02M 35/1266; F02M 29/04; F02B 1/04; F02F 1/4242

USPC ............... 123/41.7, 184.42, 184.38
See application file for complete search history.

(56) References Cited

U.S. PATENT DOCUMENTS

| 1,818,283 | A | * | 8/1931 | Spencer | 123/184.38 |
| 4,306,526 | A | * | 12/1981 | Schaub et al. | 123/257 |
| 4,527,516 | A | | 7/1985 | Foster | |
| 4,545,331 | A | * | 10/1985 | Ito et al. | 123/26 |
| 4,579,093 | A | * | 4/1986 | Eanes | 123/65 BA |
| 4,662,341 | A | * | 5/1987 | Clement | 123/556 |
| 4,732,115 | A | * | 3/1988 | Lapeyre | 123/51 B |
| 5,035,206 | A | | 7/1991 | Welch et al. | |
| 5,143,038 | A | * | 9/1992 | Dahlgren et al. | 123/403 |
| 5,537,965 | A | * | 7/1996 | Topfer et al. | 123/184.42 |
| 5,623,900 | A | * | 4/1997 | Topfer et al. | 123/184.42 |
| 6,196,204 | B1 | * | 3/2001 | Janach | 123/527 |
| 6,742,488 | B2 | | 6/2004 | Bonde et al. | |
| 7,051,702 | B2 | * | 5/2006 | Sakai et al. | 123/308 |
| 7,908,864 | B2 | | 3/2011 | Haynes et al. | |
| 8,176,889 | B2 | * | 5/2012 | Fukuda et al. | 123/184.21 |
| 2011/0307127 | A1 | | 12/2011 | Swenson et al. | |

FOREIGN PATENT DOCUMENTS

EP    2 587 043    5/2013

* cited by examiner

*Primary Examiner* — Marguerite McMahon
*Assistant Examiner* — James Kim
(74) *Attorney, Agent, or Firm* — Finnegan, Henderson, Farabow, Garrett & Dunner, LLP

(57) ABSTRACT

An engine is disclosed. The engine may have an air box. The engine may further have an opening into the air box. The engine may additionally have a baffle positioned adjacent the opening. The engine may also have a cylinder defining an intake port, with the intake port positioned in the air box. The baffle may be configured to deflect air that passes through the opening to direct the air away from the intake port of the cylinder.

20 Claims, 4 Drawing Sheets

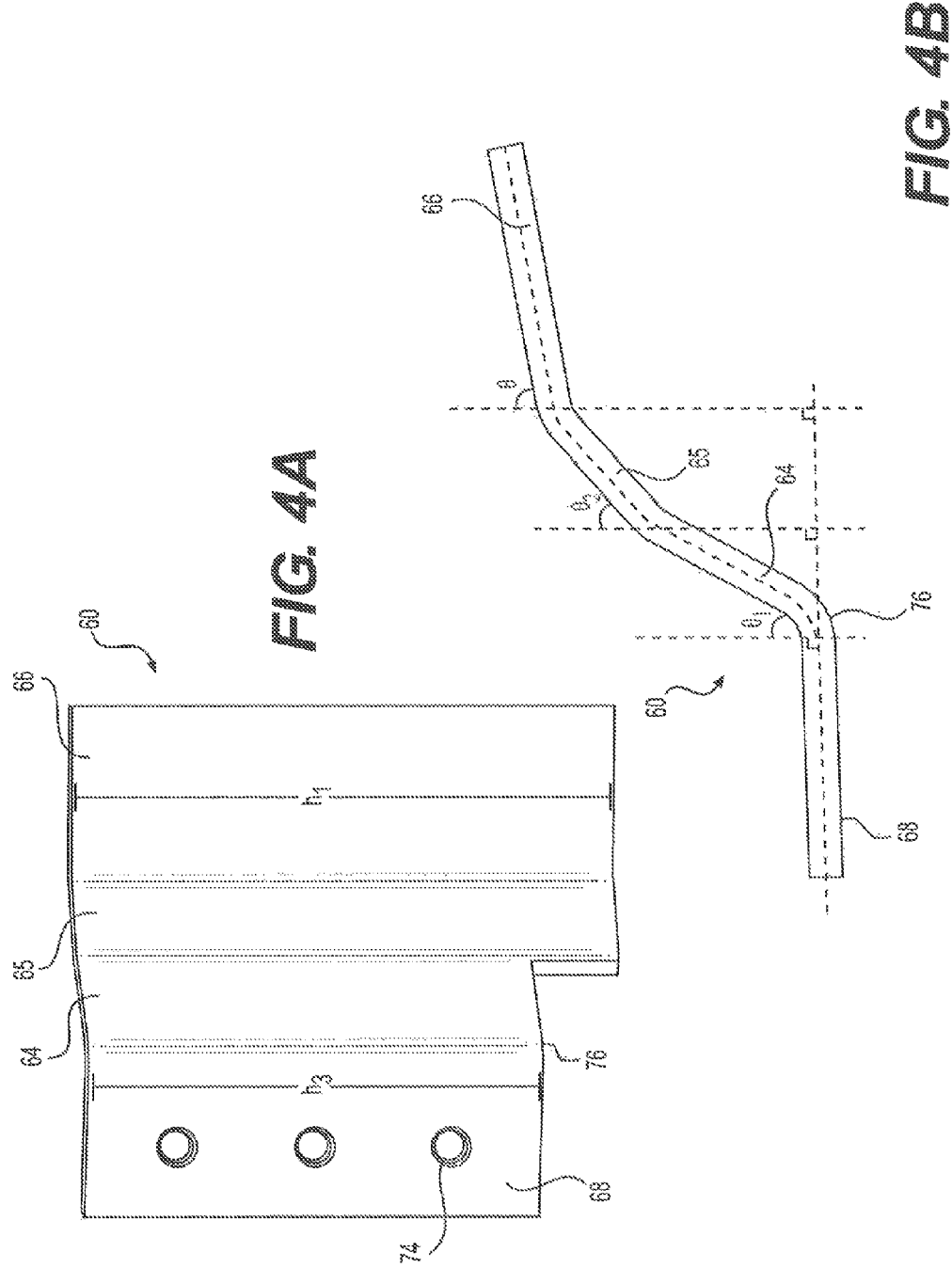

US 9,163,595 B2

ENGINE HAVING AN AIR BOX BAFFLE

TECHNICAL FIELD

The present disclosure is directed to an engine and, more particularly, to an engine having an air box baffle.

BACKGROUND

Due to the rising cost of liquid fuel (e.g., diesel fuel), engine manufacturers have developed gaseous-fuel and dual-fuel engines that utilize low-cost gaseous fuel (e.g., natural gas). In these types of engines, gaseous fuel is introduced into the engine cylinders for subsequent combustion and production of mechanical power. In some engines (e.g., some dual-fuel locomotive engines), gaseous fuel is injected into each cylinder through air intake ports during an air intake portion of each engine cycle. The gaseous fuel mixes with the intake air to create a mixture that is combustible when ignited, such as via compression or ignition of a small amount of diesel fuel. These engines often include turbochargers that increase the power density of the engine by compressing and increasing the amount of air transferred to the engine and thus the amount of fuel that can be combusted during each engine cycle. The compressed air may be transferred into an air box associated with a cylinder bank and supplied through the air intake ports in the sides of each cylinder.

An example of a dual-fuel engine is described in U.S. Pat. No. 4,527,516, which issued to Foster on Jul. 9, 1985 ("the '516 patent"). The '516 patent discloses an engine that includes a supercharger that introduces intake air into an air chamber that surrounds each bank of cylinders. The intake air may be transferred from the air chamber to the engine cylinders through air intake ports. The engine of the '516 patent also includes a gas inlet pipe that introduces gaseous fuel into an engine cylinder through one of the air intake ports. The gaseous fuel mixes with the intake air for subsequent combustion to power the engine.

The engine of the '516 patent may suffer from problems associated with the introduction of supercharged intake air into the air chamber. For example, depending on the arrangement of the supercharger, the intake air flowing through the air chamber of the '516 patent may force gaseous fuel injected by the gas inlet pipe to exit a cylinder through the air intake ports and enter the air chamber. The escaped gas may subsequently enter a different cylinder, causing a uneven distribution of gaseous fuel in the engine cylinders.

This issue may be especially problematic with engines that include a turbocharger (or supercharger) that introduces compressed air into only one end of a cylinder bank. Due to its proximity, the cylinder that is closest to the turbocharger may experience higher variations of air flow rate across its air intake ports than the rest of the cylinders (e.g., higher flow rates at intake ports facing the turbocharger). The higher variation of air flow rate may cause injected gaseous fuel to escape and enter an air box that surrounds the cylinders. Therefore, in these applications, the cylinder closest to the turbocharger may be especially susceptible to experiencing a reduction in gaseous fuel concentration as compared to the rest of the cylinders in the cylinder bank.

The present disclosure is directed to overcoming one or more of the problems set forth above and/or other problems of the prior art.

SUMMARY

In one aspect, the present disclosure is directed to an engine. The engine may include an air box. The engine may further include an opening into the air box. The engine may additionally include a baffle positioned adjacent the opening. The engine may also include a cylinder defining an intake port, with the intake port positioned in the air box. The baffle may be configured to deflect air that passes through the opening to direct the air away from the intake port of the cylinder.

In another aspect, the present disclosure is directed to a method of operating an engine. The method may include supplying air through an opening into an air box of the engine. The method may also include deflecting at least some of the air that enters the opening away from a first intake port with a baffle positioned adjacent the opening. The method may further include delivering the deflected air into a second intake port.

BRIEF DESCRIPTION OF THE DRAWING

FIGS. 4A-4B depict an exemplary disclosed air box baffle that may be used in conjunction with the engine of FIG. 1.

DETAILED DESCRIPTION

Figure 1:
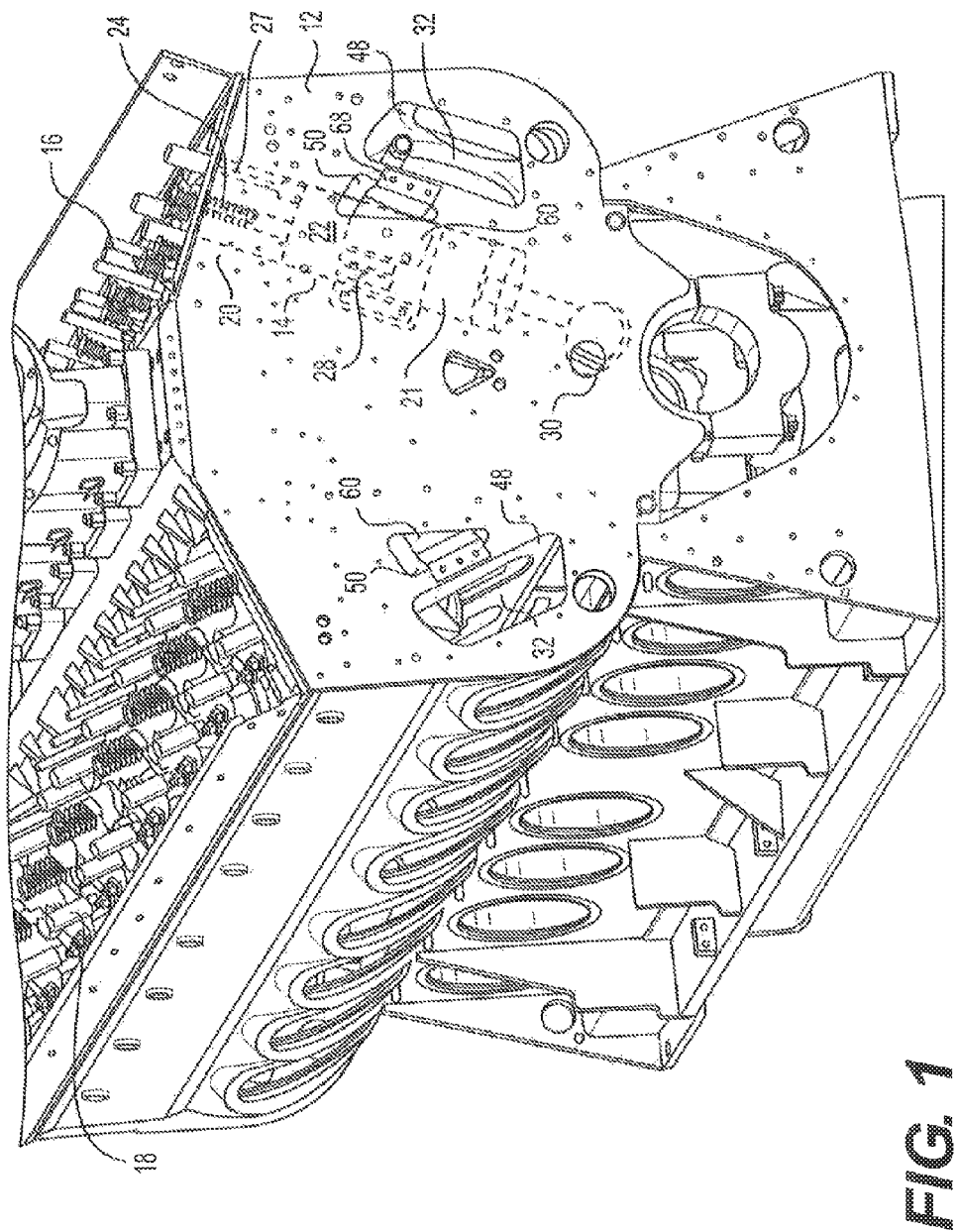
FIG. 1 is an illustration of an exemplary disclosed engine.

FIG. 1 illustrates an exemplary internal combustion engine 10. Engine 10 is depicted and described as a two-stroke dual-fuel engine, although it should be understood that other types of engines are possible. Engine 10 may include an engine block 12 that at least partially defines a plurality of cylinders 14. In an exemplary embodiment, the plurality of cylinders 14 may be arranged in a V-type configuration, including a pair of cylinder banks 16 and 18. Each cylinder bank 16 and 18 may include eight cylinders 14 arranged in a straight-line configuration. While a V-type, sixteen-cylinder engine is described, it should be understood that engine 10 may include any number of cylinders 14 arranged in any configuration known in the art.

Each cylinder 14 may have an associated cylinder head 20 and a piston 21 slidably disposed within each cylinder 14. For the purposes of this disclosure, it should be understood that each cylinder 14 may refer to a cylinder liner inside engine block 12. Each cylinder 14, cylinder head 20, and piston 21 may together define a combustion chamber 22 that receives liquid fuel (e.g., diesel fuel) from a liquid fuel injector 24 and gaseous fuel from a gaseous fuel injector 26 (shown only in FIG. 2). Each cylinder 14 may also have an associated exhaust port 27 configured to be opened and closed to selectively allow exhaust to exit combustion chamber 22. Each cylinder bank 16, 18 may be associated with an air box 32 that surrounds at least a portion of each cylinder 14 in the respective cylinder bank 16, 18 (i.e., at least a portion of each cylinder 14 is positioned in air box 32). While air box 32 is described herein, it should be understood that, in other embodiments, air box 32 may be an intake manifold or other air supply passage configured to supply air or other gas to an engine cylinder.

Within each cylinder 14, the associated piston 21 may be configured to reciprocate between a bottom-dead-center (BDC) or lower-most position, and a top-dead-center (TDC) or upper-most position. Each piston 21 may be operably connected to a crankshaft 30 in a manner known in the art. As crankshaft 30 rotates through about 180 degrees, each piston 21 may move through one full stroke between BDC and TDC. Engine 10, being a two-stroke engine, may have a complete cycle that includes a power/exhaust/intake stroke (TDC to BDC) and an intake/compression stroke (BDC to TDC).

During a final phase of the power/exhaust/intake stroke, air may be drawn into each combustion chamber 22 via one or more air intake ports 28 defined by a sidewall of each cylinder 14. In particular, as piston 21 moves downward within cylinder 14, a position will eventually be reached at which air intake ports 28 are no longer blocked by a crown of piston 21 and instead are fluidly communicated with combustion chamber 22. When air intake ports 28 are in fluid communication with combustion chamber 22 and a pressure of air at air intake ports 28 is greater than a pressure within combustion chamber 22, air may pass from air box 32 through air intake ports 28 into combustion chamber 22.

In addition, while air intake ports 28 are open, gaseous fuel (e.g., natural gas consisting of 90-95% methane) may be introduced into combustion chamber 22 by gaseous fuel injector 26. The gaseous fuel may be injected through one or more air intake ports 28 via any number of gaseous fuel injectors 26. Thereafter, the gaseous fuel may mix with the air to form a mixture of air and gaseous fuel within combustion chamber 22. The mixture of air and gaseous fuel may be compressed and ignited by an injection of liquid fuel during the intake/compression stroke to produce mechanical power and restart the power/exhaust/intake stroke.

Each liquid fuel injector 24 may be positioned inside a respective cylinder head 20 and configured to inject liquid fuel into a top of combustion chamber 22 by releasing fuel axially towards an interior of cylinder 14 in a generally cone-shaped pattern. Liquid fuel injectors 24 may be configured to cyclically inject a fixed amount of liquid fuel, for example, depending on a current engine speed and/or load. In an exemplary embodiment, the liquid fuel may act as an ignition source for the gaseous fuel, such that a smaller amount may be necessary than what may be needed for engine 10 if it were running on only liquid fuel. While engine 10 is described herein as a dual-fuel engine, it should be understood that, in other embodiments, engine 10 may run only on gaseous fuel, which may be compression-ignited or spark-ignited, for example.

In an exemplary embodiment, engine 10 may include or be connected to a turbocharger 46 (shown only in FIG. 2) configured to introduce compressed air into air box 32 through openings 48, 50 in engine block 12. Turbocharger 46 may operate in a manner known in the art to increase the supply of air to each cylinder and thereby increase power output of engine 10. For example, exhaust gas from engine 10 may cause rotation of a turbine to power a compressor that pressurizes air for introduction into air box 32 and eventually cylinders 14. Further, it should be understood that turbocharger 46 is merely exemplary and that other air delivery devices (e.g., supercharger, inlet open to atmosphere, etc.) are possible.

A baffle 60 may be associated with air box 32 of each cylinder bank 16, 18. Each baffle 60 may be positioned adjacent a respective opening 50. For example, baffle 60 may be attached to engine block 12 by an attachment section 68 at a location outside of air box 32, and extend into air box 32 through opening 50. In other embodiments, baffle 60 may be attached inside air box 32. Baffle 60 may be configured to direct air from turbocharger 46 as it enters air box 32 through openings 50.

Figure 2:
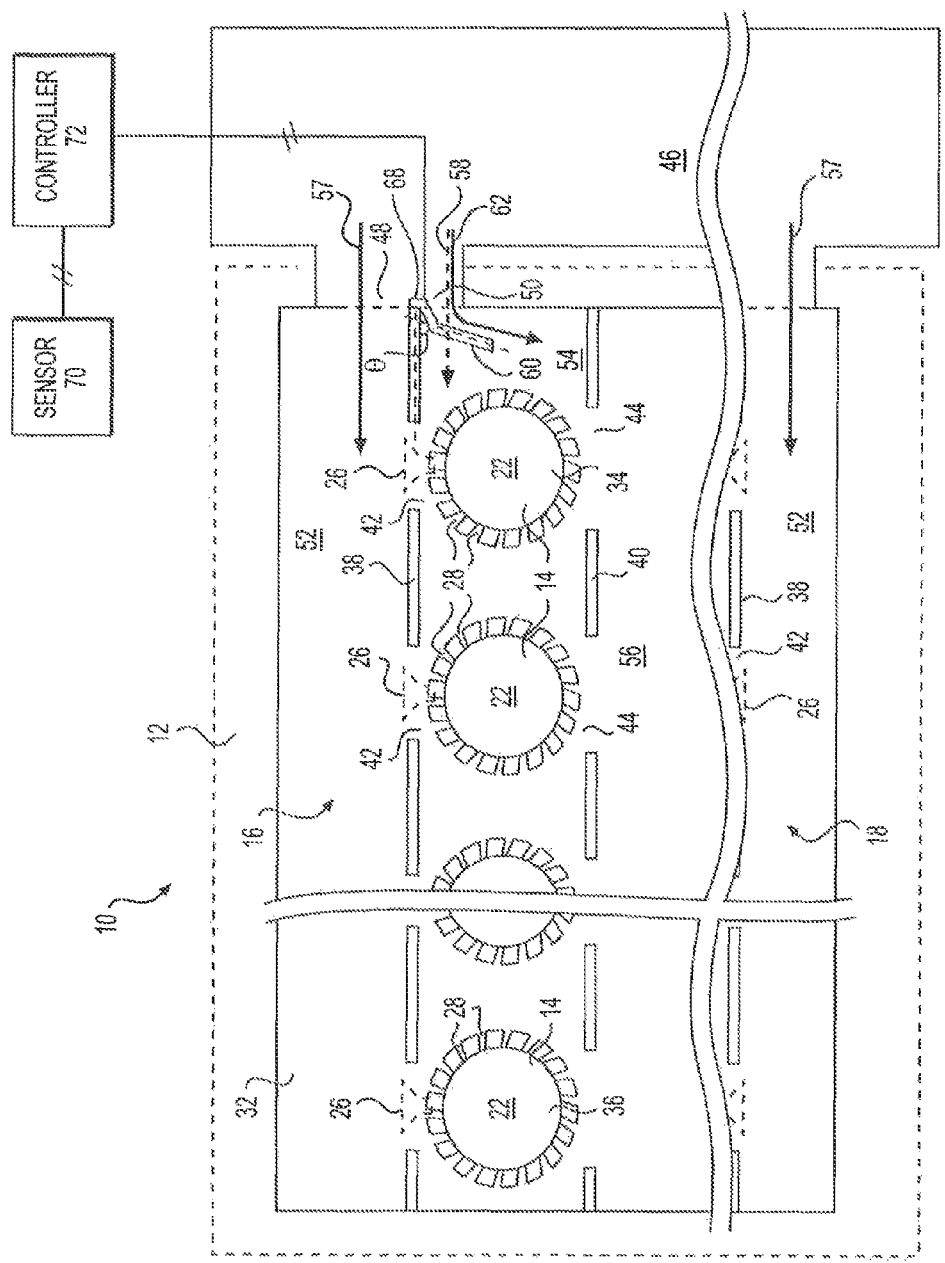
FIG. 2 is a cross-sectional illustration of an exemplary disclosed air box that may be used in conjunction with the engine of FIG. 1.

FIG. 2 illustrates a cross-sectional view of air box 32, depicting some of cylinders 14 of cylinder bank 16. Cylinders 14 of cylinder bank 16 may include a proximal cylinder 34 through a distal cylinder 36, arranged in a straight line. For example, proximal cylinder 34 may be the eighth of eight cylinders (with distal cylinder 36 being the first). At least a portion of each cylinder 14 may be arranged in air box 32. As described above, each cylinder 14 may include air intake ports 28. Air intake ports 28 may be positioned inside air box 32 such that air may be transferred from air box 32 to combustion chambers 22. While not shown, it should be understood that cylinder bank 18 may be arranged in a similar manner to cylinder bank 16 (e.g., a mirror-image arrangement within air box 32).

Air box 32 may include a portion associated with cylinder bank 16 and a portion associated with cylinder bank 18. Each portion may include a first wall 38 and a second wall 40 that separate air box 32 into a plurality of sections 52, 54, and 56. In an exemplary embodiment, section 56 may be a singular section that connects each cylinder bank 16, 18 of air box 32 to each other. Section 56 of air box 32 may be connected on two sides to a respective section 54 (only one shown), which may each be further connected to a respective section 56. While air flow within the portion of air box 32 associated with cylinder bank 16 is described below, it should be understood that air flow within the portion of air box 32 associated with cylinder bank 18 may occur in a similar manner. Further, air flow through each portion of air box 32 may interact within section 56.

Figure 3:
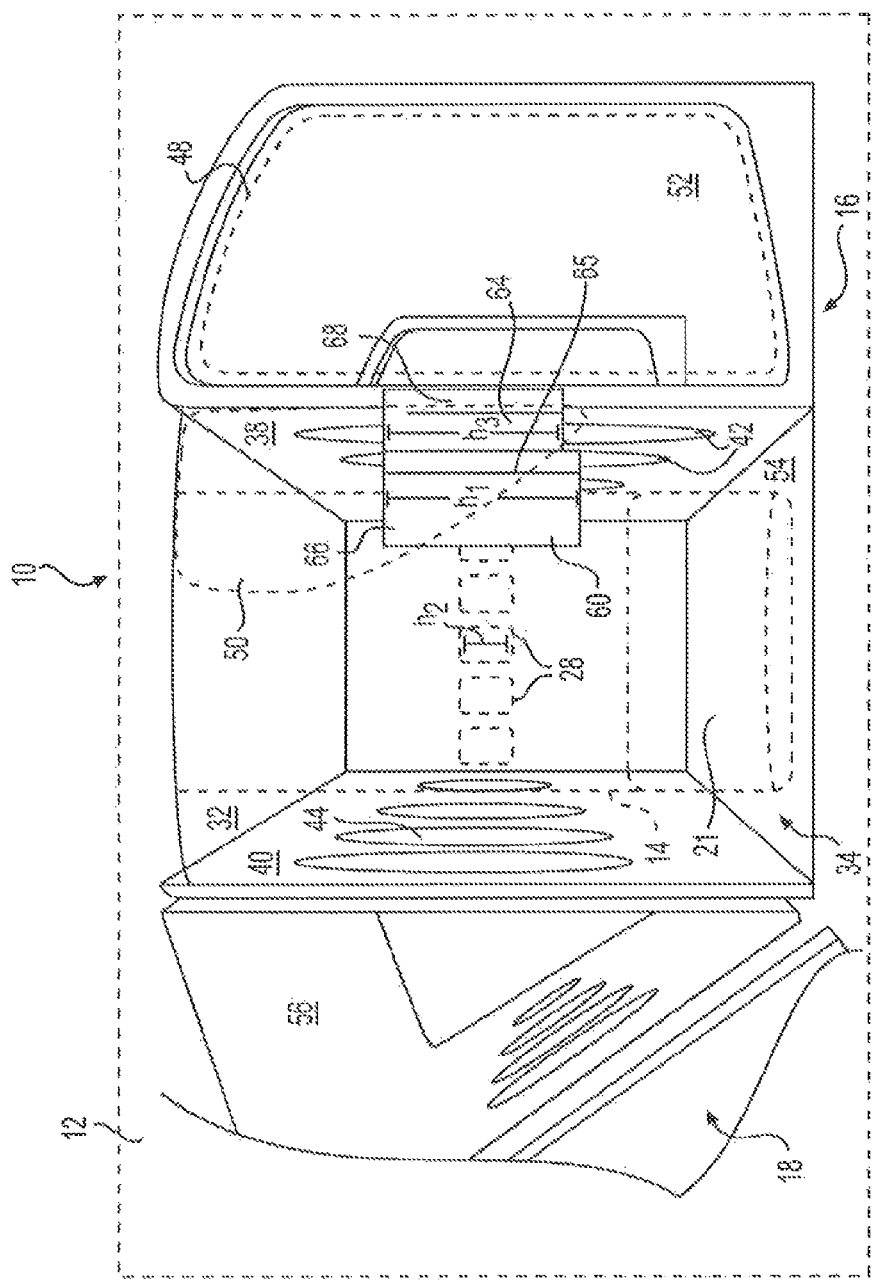
FIG. 3 is a front-view illustration of the air box of FIG. 2.

First wall 38 and second wall 40 may extend in a direction substantially perpendicular to openings 48, 50. First wall 38 and second wall 40 may include a plurality of openings 42, 44, respectively, that fluidly communicate each of the plurality of sections 52, 54, and 56. In an exemplary embodiment, openings 42, 44 may be circular (as shown in FIG. 3). Some air from turbocharger 46 may enter a side section 52 of air box 32 through opening 48. This air may enter a center section 54 of air box 32 through openings 42 to supply at least some of cylinders 14. In addition, some air from turbocharger 46 may enter center section 54 directly through opening 50. Further, some air that enters center section 54 may reach a side section 56 through openings 44 for further distribution and flow throughout air box 32.

As depicted in FIG. 2, air that enters air box 32 through opening 48 may flow in a direction 57 parallel to first wall 38. This air may fill side section 52 and distribute air to cylinders 14 through openings 42. For example, the air that enters air box 32 through opening 48 may reach a distal end of side section 52 and be redirected into center section 54 by a pressure differential within air box 32.

Unlike the air that enters opening 48, at least some of the air that enters air box 32 through opening 50 may be prevented from flowing in a direction 58 parallel to first wall 38. In particular, baffle 60 may be arranged to deflect air entering through opening 50 such that the air flows in a direction 62 that is angled with respect to first wall 38. In this way, air may be prevented from flowing along direction 58, straight into intake ports 28 of proximal cylinder 34.

Baffle 60 may be generally arranged such that at least a distal portion extends from first wall 38 into center section 54 and towards proximal cylinder 34 at an angle θ with respect to first wall 38. In this way, at least some air that is redirected by baffle 60 may flow in a direction parallel to the angle θ. In some embodiments, baffle 60 may be fixedly attached by attachment section 68 to engine block 12, and extend away from first wall 38 at the angle θ. In an exemplary embodiment, the angle θ may be fixed at an angle of approximately 70-90°, and in particular, the angle θ may be approximately 81°.

In other embodiments, baffle 60 may be adjustable. For example, an extending portion of baffle 60 may be connected to attachment section 68 by a movable hinge that allows baffle 60 to move through a range of angles θ. Adjustable baffle 60 may be manually or electronically controlled to set the angle $\theta$ according to a particular criteria. For example, in some embodiments, a sensor 70 may measure a parameter and a controller 72 may send a signal to the movable hinge to set the angle $\theta$, according to a particular algorithm, table, map, etc. The measured parameter may be any condition that indicates a flow and/or presence of air and/or gaseous fuel within air box 32. For example, the measure parameter may be an air flow rate, a gaseous fuel flow rate, a ratio of air to gaseous fuel, a flow rate difference of air and/or gaseous fuel between two or more cylinders, an amount or presence of gaseous fuel in the air box, etc.

FIG. 3 further illustrates an interior of air box 32 from the perspective of turbocharger 46 near cylinder bank 16. Baffle 60 may extend into opening 50, away from first wall 38, and toward proximal cylinder 34. Baffle 60 may include a plurality of sections, including intermediate sections 64, 65 and a distal section 66. As discussed above, distal section 66 may extend from first wall 38 at an angle $\theta$.

Baffle 60 may be generally sized and positioned to deflect air that may otherwise directly enter air intake ports 28 of proximal cylinder 34. In other words, baffle 60 may be positioned such that a height $h_1$ of distal section 66 overlaps a height $h_2$ of air intake ports 28. In an exemplary embodiment, height $h_2$ may be approximately 15-25% of height $h_1$. Therefore, air that enters opening 50 at the same level as air intake ports 28 may be deflected by baffle 60 away from at least one of intake ports 28 of proximal cylinder 34. In order to accommodate a shape of opening 50, a height $h_3$ of intermediate section 64 may be less than height $h_1$. In this way, intermediate section 64 may traverse from outside of air box 32 into opening 50, and distal section 66 may extend beyond a lower edge of opening 50 inside air box 32 to cover air intake ports 28. For example, $h_3$ may be approximately 80-85% of $h_1$. Intermediate section 65 may have the same height $h_1$ as distal section 66.

FIGS. 4A-4B further depict an exemplary embodiment of baffle 60, which may correspond to baffle 60 located on the left side of engine 10, as shown in FIG. 1. As shown in FIG. 4A, attachment section 68 may include a plurality of holes 74, which may be used to attach baffle 60 to engine block 12, such as by bolts. Attachment section 68 may be connected to intermediate section 64 via transition section 76. In some embodiments, transition section 76 may be a rounded portion that fixedly connects intermediate section 64 to attachment section 68. In embodiments in which baffle 60 is adjustable, transition section 76 may be a movable hinge, which may be electronically adjustable by controller 72 (shown only in FIG. 2). Intermediate section 65 and distal section 66 may be connected to intermediate section 64 such that distal section 66 extends at angle $\theta$.

As shown in the top view depicted in FIG. 4B, the formation of angle $\theta$ may be gradual, with each intermediate section 64, 65 and distal section 66 extending at different angles relative to first wall 38 and each other. As shown in FIG. 4B, intermediate sections 64, 65 may extend away from first wall 38 (not shown in FIG. 4B, but which may be perpendicular to attachment section 68) at angles of $\theta_1$ and $\theta_2$, respectively. In an exemplary embodiment, a total angle formed by intermediate sections 64, 65 (e.g., $\theta_2$) may be approximately 60-65% of the angle $\theta$. For example, in the embodiment in which the angle $\theta$ is approximately 81°, intermediate section 64 may extend from first wall 38 at an angle of 30° ($\theta_1$=30°), intermediate section 65 may extend from intermediate section 64 at an angle of 20° ($\theta_2$=50°), and distal section 66 may extend from intermediate section 65 at an angle of 31° ($\theta$=81°). However, it should be understood that these angle values are exemplary and that other angles are possible. Alternatively, one or more of intermediate sections 64, 65 may be a rounded section. Any combination of sections that result in distal section 66 extending from first wall 38 at the angle $\theta$ is within the scope of baffle 60.

The exemplary disclosed baffle 60 may be used in conjunction with turbocharger 46 to control the transfer of compressed air into air box 32. An exemplary process by which engine 10 is operated and baffles 60 are used to help control the flow of air to cylinders 14 is described in more detail below.

Industrial Applicability

The exemplary disclosed baffle may be applicable to any engine that includes an air box or other air passage that supplies a gas (e.g., air) to one or more cylinders. The exemplary disclosed baffle may be particularly applicable to an engine that includes a turbocharger or supercharger, which may cause disproportionate air flow rates at the air intake ports of the engine cylinders. If the engine is a gaseous-fuel or dual-fuel engine, the exemplary disclosed baffle may be used to help prevent the entering intake air from forcing gaseous fuel out of some of the cylinders (e.g., the cylinder closest to the air entrance) and into other cylinders. This may help prevent a high variation of air flow rates across air intake ports, thereby helping to ensure that gaseous fuel remains in the appropriate cylinder. Reducing the variation of air flow rates and keeping gaseous fuel in the appropriate cylinders may help to maintain consistent ratios of air to gaseous fuel across cylinders and engine cycles, which may promote efficient operation of the engine. Operation of exemplary disclosed engine 10 and the effect of baffle 60 is described in more detail below.

During an exemplary engine cycle of engine 10, each piston 21 associated with each cylinder 14 may move through a power/exhaust/intake stroke in which each piston 21 moves from the TDC position to the BDC position. At a certain point during the stroke, piston 21 may uncover air intake ports 28, which become open to fluid communication with air box 32. While air intake ports 28 are opened, a pressure difference may cause air to flow from air box 32 through air intake ports 28 into combustion chambers 22.

Once piston 21 reaches the BDC position, it may reverse direction and begin an intake/compression stroke. During this stroke, air intake ports 28 may remain at least partially open until the crown of piston 21 reaches a point at which air intake ports 28 are covered and therefore closed off from air box 32. Intake air may continue to enter combustion chamber 22 until air intake ports 28 are closed. In addition to receiving intake air, combustion chambers 22 may receive gaseous fuel from gaseous fuel injectors 26. Gaseous fuel injectors 26 may inject gaseous fuel into combustion chamber 22 at any time while air intake ports 28 are opened, according to a particular injection timing of engine 10.

After air intake ports 28 are closed, piston 21 may continue towards a TDC position, compressing the mixture of air and gaseous fuel. As the mixture of air and gaseous fuel within each combustion chamber 22 is compressed, a temperature of the mixture may increase. At a point when piston 21 is near TDC, a liquid fuel (e.g. diesel or other petroleum-based liquid fuel) may be injected into combustion chamber 22 via liquid fuel injector 24. The liquid fuel may be ignited by the hot air/fuel mixture, causing combustion of both types of fuel and resulting in a release of chemical energy in the form of temperature and pressure spikes within combustion chamber 22. During a first phase of a new power/exhaust/intake stroke, the pressure spike within combustion chamber 22 may force piston 21 downward, thereby imparting mechanical power to crankshaft 30. At a particular point during this downward travel, exhaust ports 27 located within cylinder head 20 may open to allow pressurized exhaust within combustion chamber 22 to exit and the cycle will restart.

In an exemplary disclosed embodiment, the exhaust released through exhaust ports 27 may be used to power turbocharger 46. Turbocharger 46 may operate to compress intake air and supply the air through openings 48, 50 into air box 32. For example, when air is removed from air box 32 via combustion chambers 22, it may be replaced by air from turbocharger 46. Air that enters through opening 48 may travel through side section 52 of air box 32 until it eventually reaches one of cylinders 14 via one of openings 42. Additional air may enter air box 32 through opening 50.

At least some of the air that enters opening 50 may be deflected by baffle 60. In particular, air that enters opening 50 at the same level as a portion of air intake ports 28 may be deflected by baffle 60 away from proximal cylinder 34. The redirected air may travel towards second wall 40 and around at least one of the intake ports 28 of proximal cylinder 34. The air may subsequently enter another intake port 28 of proximal cylinder 34 or travel through at least one of center section 54 and side sections 52, 56 before entering an intake port 28 of another cylinder 14. Air entering through opening 48 may be delivered to the particular intake ports 28 that receive less air due to deflection by baffle 60.

In an embodiment in which baffle 60 is adjustable, a control process may be utilized to set the angle θ of baffle 60. While engine 10 operates, sensor 70 may monitor a condition, such as a flow rate of gaseous fuel out of proximal cylinder 36. Sensor 70 may send a signal with the measured condition to controller 72, which may determine if an adjustment to baffle 60 is necessary. If controller 72 determines that an adjustment is necessary (e.g., a measured flow rate of gaseous fuel is above a threshold), controller 72 may send a signal to a portion of baffle 60 (e.g., an electronically-controlled movable hinge) to adjust the angle θ of baffle 60, accordingly, such as to reduce the flow rate of gaseous fuel out of proximal cylinder 36.

Baffle 60 may be specifically configured for engine 10 to help prevent air from flowing directly into some of intake ports 28 of proximal cylinder 34 (e.g., intake ports 28 that face turbocharger 46) and thereby causing a high variation of air flow rate across the air intake ports 28 of proximal cylinder 34. In particular, the angle θ, height $h_1$, and position of baffle 60 may be chosen such that a standard deviation of the air flow rate at each air intake port 28 of proximal cylinder 34 is commensurate with the other cylinders 14. Further, baffle 60 may be adjustable such that the angle θ may be dynamically changed. In this way, baffle 60 may reduce a flow of gaseous fuel out of proximal cylinder 34 after it has been injected by gaseous fuel injector 26, and a more even distribution of air and gaseous fuel between each cylinder 14 may be more consistently maintained. An even distribution of air and gaseous fuel may be advantageous because it may result in greater control over the ratio of air to gaseous fuel present in each cylinder 14 during each engine cycle, which is an important factor in maintaining efficient use of engine 10. Therefore, baffle 60 may be used to help achieve more efficient operation of engine 10.

It will be apparent to those skilled in the art that various modifications and variations can be made to the engine of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. An engine, comprising:
   an air box;
   an opening into the air box;
   a baffle positioned adjacent the opening,
   a cylinder defining a plurality of intake ports, the intake ports positioned in the air box; and
   a gaseous fuel injector configured to inject fuel into the cylinder through a first intake port of the plurality a ports;
   wherein at least two of the plurality of intake ports are opposed from each other and form a pathway through the cylinder, and
   wherein the baffle is configured to deflect air that passes through the opening to direct the air away from the pathway and thereby inhibit the air from pushing the gaseous fuel out of the cylinder after it has been injected.

2. The engine of claim 1, wherein the air box includes a wall substantially perpendicular to the opening, and the baffle extends away from the wall at an angle.

3. The engine of claim 2, wherein the baffle extends away from the wall at an angle of approximately 70-90°.

4. The engine of claim 3, wherein the baffle extends away from the wall at an angle of approximately 81°.

5. The engine of claim 2, wherein the baffle includes at least one intermediate section and a distal section, the at least one intermediate section and the distal section extending away from the wall at different angles.

6. The engine of claim 5, wherein the at least one intermediate section extends away from the wall at an angle that is approximately 60-65% of an angle at which the distal section extends away from the wall.

7. The engine of claim 5, wherein the at least one intermediate section includes a first intermediate section and a second intermediate section, the first intermediate section and the second intermediate section extending away from the wall at different angles.

8. The engine of claim 1, wherein the baffle is positioned such that a height of the baffle overlaps a height of the intake ports.

9. The engine of claim 8, wherein the height of the baffle is greater than the height of the intake ports.

10. The engine of claim 9, wherein the height of the intake ports is approximately 15-20% of the height of the baffle.

11. The engine of claim 1, wherein:
    the baffle includes an intermediate section and a distal section, and
    a height of the distal section is greater than a height of the intermediate section.

12. The engine of claim 1, further including a movable hinge configured to secure the baffle to the air box, wherein the movable hinge is movable to adjust the position of the baffle with respect to the opening.

13. A method of operating an engine, comprising:
    supplying air through an opening into an air box of the engine;
    injecting gaseous fuel into a first cylinder of the engine;
    deflecting the air that enters the opening away from a pathway formed in the first cylinder with a baffle positioned adjacent the opening, wherein the pathway is formed by at least first and second intake ports of a plurality of intake ports defined by the first cylinder, and wherein the deflecting inhibits the air from entering the first cylinder through and pushing the gaseous fuel out of the first cylinder; and delivering the deflected air into a second cylinder through at least one of a plurality of intake ports defined by the second cylinder.

14. The method of claim 13, wherein the gaseous fuel is injected into a third intake port.

15. The method of claim 13, further comprising adjusting a position of the baffle to change an angle of the baffle with respect to the opening.

16. The method of claim 15, wherein adjusting the position of the baffle includes electronically controlling a movable hinge via a signal from a controller.

17. The method of claim 13, wherein:
supplying air through an opening includes supplying air through a first opening and supplying air through a second opening, and
only air that is supplied through the first opening is deflected by the baffle.

18. The method of claim 17, further comprising delivering air through the second opening and into the first intake cylinder.

19. An engine, comprising:
an engine block;
an air box;
a plurality of cylinders, each cylinder defining a plurality of air intake ports positioned in the air box;
a cylinder head associated with each of the plurality of cylinders;
a piston disposed within each of the plurality of cylinders;
a combustion chamber at least partially defined by the cylinder, the cylinder head, and the piston;
a gaseous fuel injector configured to inject gaseous fuel into the combustion chamber through one of the plurality of intake ports;
a turbocharger configured to introduce air into the air box through an opening; and
a baffle positioned adjacent the opening,
wherein:
the gaseous fuel injector is configured to inject gaseous fuel into a combustion chamber of a cylinder closest to the opening through a first intake port of the plurality of intake ports;
at least two of the plurality of intake ports are opposed from each other and form a pathway through the cylinder closest to the opening; and
the baffle is configured to deflect air that passes through the opening to direct the air away from the pathway and thereby inhibit the air from pushing the gaseous fuel out of the cylinder after it has been injected.

20. The engine of claim 1, wherein the opening defines a width and the baffle extends across an entirety of the width.

* * * * *